US012528232B2

(12) United States Patent
Herchl et al.

(10) Patent No.: US 12,528,232 B2
(45) Date of Patent: Jan. 20, 2026

(54) METHOD FOR THE UTILIZATION OF CONSTITUENTS FROM BLENDED TEXTILE WASTES

(71) Applicant: LENZING AKTIENGESELLSCHAFT, Lenzing (AT)

(72) Inventors: Richard Herchl, Ried im Innkreis (AT); Christoph Klaus-Nietrost, Vocklabruck (AT); Sabrina Theis, Wels (AT); Christian Weilach, Vocklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 802 days.

(21) Appl. No.: 17/784,520

(22) PCT Filed: Dec. 3, 2020

(86) PCT No.: PCT/EP2020/084541
§ 371 (c)(1),
(2) Date: Jun. 10, 2022

(87) PCT Pub. No.: WO2021/115932
PCT Pub. Date: Jun. 17, 2021

(65) Prior Publication Data
US 2023/0025524 A1  Jan. 26, 2023

(30) Foreign Application Priority Data
Dec. 13, 2019 (EP) .................... 19216001

(51) Int. Cl.
*B29B 17/02* (2006.01)
*D21C 3/02* (2006.01)
*D21C 5/00* (2006.01)
*D21C 11/00* (2006.01)

(52) U.S. Cl.
CPC ............. *B29B 17/02* (2013.01); *D21C 3/02* (2013.01); *D21C 5/00* (2013.01); *D21C 11/0007* (2013.01); *B29B 2017/0296* (2013.01)

(58) Field of Classification Search
None
See application file for complete search history.

(56) References Cited

U.S. PATENT DOCUMENTS

| 3,544,622 A | 12/1970 | England |
| 4,215,224 A * | 7/1980 | Wallace ................. C07C 51/43 423/183 |
| 6,031,128 A * | 2/2000 | Roh ........................ C07C 51/09 422/184.1 |
| 6,657,077 B1 * | 12/2003 | Thauront ................. C08J 11/16 562/483 |
| 6,670,503 B2 | 12/2003 | Broccatelli |
| 2001/0023303 A1 | 9/2001 | Broccatelli |
| 2005/0076568 A1 * | 4/2005 | Stigsson ................. D21C 11/12 48/197 FM |
| 2016/0237619 A1 | 8/2016 | Weilach et al. |
| 2019/0218362 A1 | 7/2019 | Barla et al. |
| 2020/0165747 A1 | 5/2020 | Lindgren et al. |
| 2021/0130501 A1 | 5/2021 | Silbermann et al. |

FOREIGN PATENT DOCUMENTS

| CN | 1035515 A | 9/1989 |
| EP | 1138663 A1 | 10/2001 |
| WO | 2015/077807 A1 | 6/2015 |
| WO | 2018/073177 A1 | 4/2018 |
| WO | 2018/115428 A1 | 6/2018 |

OTHER PUBLICATIONS

Sciencemadness (downloaded from https://www.sciencemadness.org/whisper/viewthread.php?tid=63196, on Apr. 3, 2025 and originally posted on Feb. 8, 2015) (Year: 2015).*
Peterson, "Towards Recycling of Textile Fibers, Separation and Characterization of Textile Fibers and Blends," Master's thesis in Materials Chemistry and Nanotechnology, Chalmers University of Technology (Jan. 1, 2015).

* cited by examiner

Primary Examiner — Amy C Bonaparte
(74) Attorney, Agent, or Firm — Venable LLP

(57) ABSTRACT

The invention relates to a method for the treatment and utilization of waste liquor containing at least polyester degradation products and originating from an alkaline pulping process for the extraction of cellulose raw material from blended textile waste which contains at least a cellulose component and a polyester component. In order to make the method environmentally friendlier and more resource-efficient, it is proposed that the method comprises the following steps: the evaporation of water from the waste liquor in order to precipitate the polyester degradation product from the waste liquor and to obtain a two-phase mixture having an aqueous phase and a solid phase including the polyester degradation product, b) the separation of the solid phase from the liquid phase, and c) the thermal/energetic utilization of the solid phase.

11 Claims, No Drawings

METHOD FOR THE UTILIZATION OF CONSTITUENTS FROM BLENDED TEXTILE WASTES

The present application is a national-stage entry under 35 U.S.C. § 371 of International Patent Application No. PCT/EP2020/084541, published as WO 2021/115932 A1, filed Dec. 3, 2020, which claims priority to EP 19216001.8, filed Dec. 13, 2019, the entire disclosure of each of which is hereby incorporated by reference.

BACKGROUND OF THE INVENTION

Technical Field

The present invention relates to a method for the treatment and utilization of degradation-product-contaminated waste liquor from an alkaline pulping process for the extraction of cellulose raw material from blended textile waste.

Background Art

In recent years, reclaiming or recycling of raw materials from textile wastes has increasingly gained in importance for the textile industry, not least to reduce the environmental impact of these textile wastes.

Purely mechanical recycling of textile wastes has been commonly known for quite some time, wherein textile waste is comminuted and, from it, directly recycled end products such as cleaning wipes, filling materials, or insulating materials are produced. Spinning of yarns from such recycled textile fibers usually results in low-quality yarns that are not suitable for the production of new textiles.

Chemical recycling methods lend themselves to overcoming the above mentioned problems. For example, cellulosic fibers can, following chemical pretreatment, be spun into regenerated cellulosic fibers again. However, such processes for the production of regenerated cellulosic molded bodies are very sensitive to impurities in the cellulose raw material, which means that cellulose raw material recycled in this way is generally unsuited to spin it into fibers.

WO 2015/077807 A1 shows a process for pretreating reclaimed cotton fibers from textile wastes wherein, at first, metals are removed from said reclaimed cotton fibers which are then subjected to oxidative bleaching. The cotton fibers reclaimed in this way can then be used for the production of molded bodies from regenerated cellulose.

WO 2018/115428 A1 discloses a method for treating cotton-based raw material under alkaline conditions in combination with gaseous oxidizing agents.

WO 2018/073177 A1, in turn, describes a method for recycling cellulose raw material from cellulosic textile waste. In this case, the textile waste is treated under alkaline conditions in the presence of a reducing agent in order to swell the cellulosic fibers in the textile waste and, in this way, to facilitate the removal of impurities. Following the alkaline treatment, the cellulose raw material is bleached either with oxygen and/or with ozone.

Such methods use pure cellulosic textile waste as a starting material. However, in practice, the textile wastes from clothing and fabrics are blended textile wastes, that is, blends of cellulosic and synthetic fibers. Here, the predominant fraction is blended textile wastes that include polyester and cellulosic fibers. Likewise, textile wastes from cotton textiles are, in most cases, contaminated with polyester from sewing threads, labels, or the like. Yet, methods of the above-mentioned type are usually unable to process blended textile wastes because significant contaminations with synthetic polymer fibers, especially with polyesters, cannot be removed.

However, the present method relates to processes for the chemical treatment of blended textile wastes which, in addition to a cellulose component, also contain significant amounts of a polyester component.

US 2019/0218362 A1 describes systems and methods comprising a subcritical aqueous treatment to recycle the cellulosic and polyester components of cotton wastes and cotton/polyester blended textile wastes that would otherwise be disposed of The thesis by Anna Peterson: "Towards Recycling of Textile Fibers, Separation and Characterization of Textile Fibers and Blends, Master's Thesis in Materials Chemistry and Nanotechnology", CHALMERS UNIVERSITY OF TECHNOLOGY, Gothenburg, Sweden, Jan. 1, 2015, discloses a method for the complete hydrolysis of polyester from blended textiles using the phase transfer catalyst benzyltributyl ammonium chloride under mild conditions.

However, during alkaline chemical pulping of such blended textile waste at a suitable pressure and a suitable temperature, especially for the recovery of cellulose raw material, substantial amounts of waste liquor are produced that contain various degradation products, among them a large quantity of polyester degradation products. Such waste liquors cannot be passed on to a conventional waste water treatment process without prior treatment, as they usually have an excessively high chemical oxygen demand (COD) and metal content.

DISCLOSURE OF THE INVENTION

Therefore, it is an object of the invention to provide a method of the type mentioned at the outset for the treatment and utilization of waste liquor containing such above-mentioned degradation products, which permits the utilization of the waste liquor and reduces the burden on waste water treatment processes.

According to the invention, the defined object is achieved by a method as claimed in claim 1.

After all, if, in the method according to the invention for the treatment and utilization of degradation-product-contaminated waste liquor from an alkaline pulping process for the extraction of recycled cellulose raw material from blended textile waste, water is evaporated from the waste liquor in order to precipitate the polyester degradation product from the waste liquor and to obtain a two-phase mixture having an aqueous phase and a solid phase that includes the polyester degradation product, then this can enable a reproducible separation of the polyester degradation products from the contaminated waste liquor. Furthermore, if the solid phase is separated from the aqueous phase, then the aqueous phase of the waste liquor can be fed to a conventional waste water treatment process, thereby minimizing the burden on and the chemical oxygen demand of the waste water treatment process. Finally, the solid phase can be utilized independently of the aqueous phase, which makes it possible to design the method hereof in an environmentally friendlier manner.

For the purposes of the present invention, "polyester" mainly refers to polyethylene terephthalate (PET) which consists of the monomers terephthalic acid and ethylene glycol. However, the invention also works very well with other widely used polyesters such as polypropylene terephthalate (PPT), polytrimethylene terephthalate (PTT), polybutylene terephthalate (PBT), and the like, or also with mixtures of these polyesters. In each case, it is important that the alcoholic component, i.e., ethylene glycol, butane diol, propylene diol, trimethylene glycol, etc., is readily soluble in the treatment solution and is not precipitated along with the terephthalic acid.

For the purposes of the present invention, "waste liquor" generally refers to a spent aqueous alkaline treatment solution, the treatment solution being used to treat the blended textile waste in order to obtain recycled cellulose raw material from the cellulose component of the blended textile waste. Since the cellulose component in the blended textile waste is generally contaminated with dyes or other impurities and is mixed with the polyester component at a fiber level, the impurities and the polyester component are dissolved out in the alkaline treatment solution and degraded, more specifically hydrolyzed, into degradation products. Hence, the waste liquor contains as degradation products at least polyester degradation products and possibly degradation products from dyes or other impurities.

Thus, during the alkaline pulping process, the molecular weight and the molecular chain length of the polyester molecules in the polyester component are deliberately reduced by hydrolysis which takes place in the presence of the aqueous alkaline treatment solution. In this way, the molecules of the polyester component are gradually reduced in their molecular chain length and ultimately split into their monomeric building blocks, i.e., terephthalic acid and ethylene glycol. The type of terephthalate formed in this process in the alkaline treatment solution substantially depends on the alkaline hydrolyzing agent contained in the treatment solution. If, for example, NaOH is used, then the polyester degradation product mainly contains disodium terephthalate which is readily soluble in the treatment solution. Subsequently, this enables a process-technically simple separation of the polyester degradation products from the cellulose component, whereby the cellulose raw material can be recovered with a high degree of purity from the blended textile waste. In fact, due to the generally mild process conditions, only an insignificant degradation of the cellulose polymers in the cellulose component takes place. At the same time, however, the cellulose component can advantageously be partially pulped by the treatment solution and be freed of impurities such as dyes or cross-linking agents, which in turn benefits the quality of the recovered cellulose raw material.

The disodium terephthalate contained as a polyester degradation product in the waste liquor is precipitated when evaporating water from the waste liquor, whereby a two-phase mixture having a solid phase and an aqueous phase is formed, the solid phase including the disodium terephthalate and the aqueous phase being formed from the aqueous supernatant which contains residues of the alkaline treatment solution and possibly other degradation products. This aqueous phase can, with low environmental impact, either be fed directly to a wastewater treatment process, or, alternatively, be used to recover the alkaline treatment solution. In another embodiment, the aqueous phase is evaporated again, whereby further terephthalate can be precipitated. This increases the total calorific value of the substances obtained according to the invention, on the one hand, and further reduces the COD of the aqueous phase fed to the wastewater treatment process, on the other. The solid phase can therefore be utilized independently of the aqueous phase and does not need to be passed through a resource-intensive and environmentally unfriendly joint treatment process.

For the purposes of the present invention, "recycled cellulose raw material" refers to recycling pulp, textile pulp, cotton pulp, rag pulp, or the like, or combinations thereof. More specifically, such cellulose raw material can, in turn, be suited as a starting material for the production of regenerated cellulose fibers such as lyocell, viscose, modal, or cupro fibers. Alternatively, the recycled cellulose raw material can serve as a starting material for the production of paper, paper-like materials, or nonwovens made from pulp.

In general, it is also mentioned that, for the purposes of the present invention, "blended textile waste" may be a blend containing any given cellulose fibers which form the cellulose component of the blended textile waste and any given polyester fibers which form the polyester component. Suitable cellulose fibers include, for example, natural cellulose fibers such as cotton, flax, hemp, ramie, kapok, etc., or regenerated cellulose fibers such as rayon, viscose, lyocell, cupro, or modal. The above mentioned fibers may vary in diameter and length and may be continuous fibers (filaments) or staple fibers or also be present in nonwoven form. Such blended textile waste includes at least 1% by weight, preferably at least 2% by weight, more preferably at least 3% by weight, of each of the cellulose component and the polyester component.

Furthermore, a particularly economical and reliable recycling method can be provided if the blended textile waste is pre-consumer and/or post-consumer textile waste. Post-consumer textile waste refers to textiles that had already arrived at the end consumer and, as a result of having been used, may contain impurities, sometimes in considerable amounts. Post-consumer textile waste can comprise one or several of the following elements: used clothes such as shirts, jeans, skirts, dresses, suits, coveralls, pants, underwear, sweaters, and the like; used home textiles such as bed linen, towels, curtains, cloths, tablecloths, seat covers, upholstery fabrics, or the like; nonwoven products such as wipes, diapers, filters, or the like. Pre-consumer textile waste refers to textile materials that had not yet arrived at the end consumer, but resulted as waste in the course of production processes. This may include cutting residues or wastes from the production of clothing, home textiles, nonwovens, etc., or wastes from the production of yarns, textiles, or regenerated cellulose fibers.

Other preferred embodiments of the invention follow from the dependent claims 2 to 11.

MODES FOR CARRYING OUT THE INVENTION

In the following, the invention is exemplified based on a first embodiment variant. Further embodiment variants follow from the modifications mentioned in the description which can be combined with one another in any given way.

According to a first embodiment variant, in the method according to the invention, the degradation-product-containing waste liquor which originates from an alkaline pulping process for the extraction of recycled cellulose raw material from blended textile waste is treated and utilized. Here, the blended textile waste includes at least a cellulose component and a polyester component, and either can additionally be contaminated with dyes, cross-linking agents, or the like. The alkaline pulping process is preferably alkaline cooking of the blended textile waste in an aqueous alkaline treatment solution in order to hydrolyze the polyester component into polyester degradation products and dissolve them in the treatment solution. In the pulping process, the cellulose component is only minimally dissolved out or degraded and can therefore be separated easily from the aqueous treatment solution and thus be separated from the polyester degradation products in order to obtain the recycled cellulose raw material. The remaining spent treatment solution will then be treated according to the present method as the degradation-product-containing waste liquor.

Since the waste liquor contains the degradation products from an alkaline pulping process conducted on blended textile wastes, its composition differs fundamentally from waste liquors produced in classic pulp production processes (e.g., through sulfate or sulfite pulping). The main objective of chemical pulping within the scope of the present method is also the dissolving out of polyester (especially of PET) and other non-cellulose-containing components as well as of various dyes and other substances (plastifiers, etc.) used in the textile industry from the blended textile waste in order to obtain a purified cellulose component. Therefore, as described previously, the waste liquor primarily contains polyester degradation products and is substantially devoid of lignins and other wood-specific impurities, degradation products, or constituents. As used herein, "substantially" means that all substances occurring in the method according to the invention typically do not contain any lignin. Any traces of lignin might get into the process according to the invention only by coincidence and unintentionally.

According to the first embodiment variant, NaOH is used as the hydrolyzing agent for alkaline pulping. Thus, the polyester degradation products mainly include disodium terephthalate ($C_8H_4O_4Na_2$) and monoethylene glycol ($C_2H_6O_2$). From 1 mole of PET and 2 moles of NaOH, 1 mole of disodium terephthalate and 1 mole of monoethylene glycol are stoichiometrically formed as polyester degradation products. In terms of weight, the ratio is as follows: For the conversion of 1 kg of PET, about 0.42 kg of NaOH is stoichiometrically consumed and about 1.1 kg of disodium terephthalate and 0.33 kg of monoethylene glycol are formed. Since overstoichiometric ratios of NaOH are normally used in the alkaline pulping process, the cooking waste liquor also contains corresponding amounts of unspent effective alkali/NaOH. A key property of the waste liquor is its content of the polyester degradation products disodium terephthalate and monoethylene glycol that make it impossible to treat the waste liquor with recovery methods commonly used in the pulp industry. Furthermore, as compared to conventional cooking waste liquors from pulping, the waste liquor lacks any lignin and also any hemicelluloses since it is not wood that is being pulped but blended textile wastes. Disodium terephthalate, an organic salt, poses a challenge for the process, since due to its solubility during the evaporation of the waste liquor, which is necessary for the caloric utilization of the waste liquor in order to adjust the calorific value of the waste liquor for incineration as necessary, it starts to precipitate from a solids content of approx. 20% by mass of disodium terephthalate (depending on the residual content of other solids).

In another embodiment variant, other suitable hydrolyzing agents can also be employed for alkaline pulping, but this does not need to be described in further detail herein.

The waste liquor from the alkaline pulping process has a solids content of 3-10%, depending on cooking conditions and raw material properties. The liquor first passes through a slotted screen (fiber filter) commonly used in the pulp industry in order to remove most of the remaining fiber-like constituents that would adversely affect or interfere with a subsequent evaporation process.

In a first step of the method for the treatment and utilization of the waste liquor containing the degradation products, water is evaporated from the waste liquor in order to precipitate the polyester degradation product from the waste liquor and to obtain a two-phase mixture having an aqueous phase and a solid phase including the polyester degradation product. The waste liquor freed of fiber residues is fed to an evaporation unit. In one embodiment variant, this unit can be a falling film evaporator (e.g., a thin-film evaporator) heated with low-pressure steam. Other suitable units and heating means can also be used. Now, attention must be paid to the solubility of the main components contained in the liquor. If it is taken into account, the disodium terephthalate will start to precipitate as polyester degradation product starting from a solids content of approx. 20%, and the increase to approx. 30% will then occur relatively fast. At a solids content of approx. 30%, the evaporation process should be interrupted so as to avoid adverse influences of the solid phase on the evaporation unit (caking, declining heat transfer). This is promoted particularly by the strong tendency of the disodium terephthalate particles to form larger agglomerates.

In another step of the method, the solid phase is then separated from the aqueous phase. In this process, the waste liquor evaporated to a solids content between 20 and 30% is fed to a mechanical separator. Preferably, various types of centrifuges and decanters can be used here. The solids content and the particle properties are very disadvantageous for a cake-forming filtration because such could only be accomplished through the use of large quantities of filtration agents. In this separation unit, a large part of the solid phase is separated from the aqueous phase, the latter mainly consisting of water, residual alkali, and monoethlyene glycol and its further degradation products, respectively. Here, the supernatant liquid is separated from the solid phase. Following that, the solid phase will have a solids content of approx. 60% since the still remaining inherent moisture cannot be fully separated. However, a heating or calorific value can be achieved here that is sufficient for the incineration of the solid matter in an incineration boiler since the residual moisture also contains monoethylene glycol which still increases the heating or calorific value from that of just the solid phase, with it being desirable in any case to obtain the highest possible solid matter content.

In preferred embodiments of the method according to the invention, the evaporation of water from the waste liquor takes place in two or more stages, preferably in two to ten stages, more preferably in two to six stages. The greater the number of stages employed, the more energy efficient the evaporation process will be, but also the greater the required investment will be. Particularly, the evaporation should take place in as many stages as are necessary until the final filtrate no longer contains any disodium terephthalate residue. Here, a mechanical separator (e.g., a centrifuge) can be provided downstream of every stage in order to separate the solid phase and utilize it in an incineration boiler, or the evaporation stage itself can be suitably designed for the evaporation of suspensions (e.g., thin film evaporator). In a preferred embodiment of the present invention, a mechanical separator for the separation of the solid and the liquid phase is provided downstream of at least one stage. However, a respective mechanical separator for the separation of the solid and the liquid phase can also be provided downstream of several stages.

In one embodiment variant, the thus separated solid phase is fed, by means of a screw conveyor, to an incineration boiler—in this case provided with slag tap firing—where it is incinerated for thermal and/or energetic utilization. Here, steam can be generated by the incineration by means of a steam generating unit (steam drum with natural or forced circulation). If at least part of this steam is generated as high-pressure steam, then it can also be used to generate electric power by feeding the high-pressure steam or a partial flow of the high-pressure steam to a steam turbine that drives a generator.

In the incineration boiler that preferably includes slag tap firing (a so-called soda or power boiler), soda($Na_2CO_3$) melt and also ash which is largely composed of soda ($Na_2CO_3$) is formed. The flue gas resulting during incineration is dedusted using an electrostatic or bag filter, possibly subjected to further treatment (desulfurization, denitrification), and then passed on to a stack. The separated dust, which largely consists of soda, can subsequently be collected, compacted and possibly sold to various industrial sectors.

The soda melt withdrawn from the boiler is fed to a melt dissolution tank where it is cooled down and dissolved again. Then, the thus obtained aqueous flow with dissolved sodium carbonate can either be used to neutralize acidic waste water from pulp production or—if the residual content of effective alkali is high enough—be fed to a conventional kraft process chemical recovery unit for the recovery of NaOH.

Alternatively, in another embodiment variant, a suitable quantity of acid (for example, of sulfuric acid which, on a molar basis, corresponds to the quantity of the disodium terephthalate present) can be added to the quantity of disodium terephthalate present in the cooking waste liquor for its further utilization. The reaction with sulfuric acid then produces terephthalic acid which, because of its solubility, precipitates immediately, and sodium sulfate which remains in solution. Then, the terephthalic acid could also be fed to an incineration process, and the filtrate would have to be fed to a waste water treatment process with a certain sulfate load, or the sodium sulfate is recovered from the filtrate by means of evaporation or cooling crystallization.

Depending on the residual solids content of the aqueous phase from the separator, this aqueous phase can, in one embodiment, be fed directly to a waste water treatment process, or, in an alternative embodiment, be evaporated again for further utilization. In this case, the vapors from the first evaporation step can, once compression of the vapors has taken place, be utilized for the evaporation. If necessary, fresh steam must be added (low-pressure steam). Then, the evaporated liquor is separated again into a solid and a liquid phase by using a filter or separator (depending on the solids content). Depending on the starting raw material and the separation efficiency, the filtrate can either be returned to the pulp process for washing steps or for the neutralization of acidic waste waters, or be fed to a waste water treatment plant. The solid material which is obtained again is fed to the incineration boiler.

EXAMPLE

Post-consumer waste textiles (mixture of cotton and polyester, 80 to 20 wt %) were cooked with soda lye (15 wt % of NaOH, based on the mass of waste textiles) at a liquor ratio of 1:7 (mass of waste textiles : lye). The temperature was 150° C. for a cooking duration of 120 min. Because of the depolymerization of the polyester fibers which took place under these conditions, the disodium terephthalate formed and water-soluble under these conditions got into the cooking liquor which was eventually separated from the remaining solid material (the cotton fibers) by means of a screen.

The cooking of waste textiles produces a liquor quantity of approx. 1.75 t per hour, with a dry substance content of approx. 10% and a temperature just below the boiling temperature (approx. 95° C.). In a successive multi-stage arrangement of evaporation and filtration, this waste liquor is thickened to a dry substance content of 65%, the liquor having a calorific value of 7,300 kJ/kg. The mass flow after the evaporation is 0.27 t/h. This takes place in three successively arranged evaporation stages, the reuse of vapors being omitted for the time being and each stage being supplied with fresh steam. For the entire evaporation, one needs approx. 1.52 t/h of steam at a temperature level of 115° C. and 1.677 bara, which corresponds to a quantity of low-pressure steam of approx. 1.47 t/h (4.9 bara, 155° C.). Following each evaporation, the solid material is separated by means of a filtration unit and eventually mixed again with the filtrate so as to prevent caking on the heating surfaces and transport problems. Here, the total condensate quantity is 1.48 t/h. This corresponds to a thermal output of approx. 3.4 GJ/hr. The thickened liquor stream is then fed to a liquor incineration boiler (natural circulation). At an incineration chamber temperature above the ash melting temperature (approx. 870° C.), and under the assumption of complete incineration, with a fresh water supply of approx. 330 kg/hr, the following process streams can be generated therefrom:

Flue gas: approx. 1000 $Nm^3$/hr at a temperature of 130° C. and a pressure of 1.00 bara and having the following composition:
$CO_2$: 12.3 vol %
$N_2$: 66.18 vol %
$O_2$: 1.27 vol %
$H_2O$: 20.24 vol %
$SO_2$: 0.0033 vol%

Ash: approx. 8.5 kg/hr, at an ash temperature of 210° C. and having a composition that includes 99.1% of sodium carbonate (rest: sodium sulfate)

Melt: approx. 77 kg/hr at a temperature of 850° C. and of the following composition ($Na_2CO_3$: 96.45 wt %, $Na_2SO_4$: 0.18 wt %, $Na_2S$: 0.9 wt %, rest: carbon and inert materials)

Energy in the form of high-pressure steam (500° C., 50 bar): approx. 300 kg/hr

Required additional air for incineration: approx. 900 $m^3$/hr (controlled to 9% of excess air)

Boiler blowdown: approx. 6.5 kg/hr

The invention claimed is:

1. A method for the treatment and utilization of waste liquor, the waste liquor being aqueous and containing polyester degradation products, the method comprising the following steps:
   a) obtaining the waste liquor by extracting a cellulose raw material from a blended textile waste, the blended textile waste comprising a cellulose component and a polyester component, wherein the polyester component undergoes an alkaline hydrolysis to form the polyester degradation products and wherein the cellulose component is separated from the polyester degradation products to obtain the cellulose raw material,
   b) evaporating water from the waste liquor to precipitate the polyester degradation products from the waste liquor and to obtain a two-phase mixture having an aqueous phase and a solid phase, the two-phase mixture including the polyester degradation products,
   c) separating the solid phase from the aqueous phase, and
   d) utilizing the solid phase.

2. The method as claimed in claim 1, wherein, following step c), the aqueous phase is fed to a waste water treatment process or put to another use in the pulp production process.

3. The method as claimed in claim 1, wherein the solid phase is utilized thermally in step d) for the generation of energy in the form of steam and/or electric power.

4. The method as claimed in claim 3, wherein, in step d), the solid phase is fed to a boiler provided with slag tap firing.

5. The method as claimed in claim 1, wherein, in step b), water is evaporated from the waste liquor until the waste liquor has a solid content between 20 and 40 wt %.

6. The method as claimed in claim 1, wherein the waste liquor includes NaOH and the polyester degradation products comprise a sodium salt of terephthalic acid.

7. The method as claimed in claim 1, wherein step b) is repeated twice or more.

8. The method as claimed in claim 7, wherein, in step c), a mechanical separator is used for separating the solid and the liquid phase.

9. The method as claimed in claim 7, wherein the waste liquor contains disodium terephthalate prior to step b) and wherein step b) is repeated until the two phase mixture does not contain disodium terephthalate.

10. The method as claimed in claim 1, wherein step b) is repeated at least twice and up to ten times.

11. The method as claimed in claim 1, wherein step b) is repeated at least twice and up to six times.

\* \* \* \* \*